Oct. 4, 1927.
G. C. THOMAS, JR
1,644,304
CABLE CONNECTER
Filed July 11, 1925
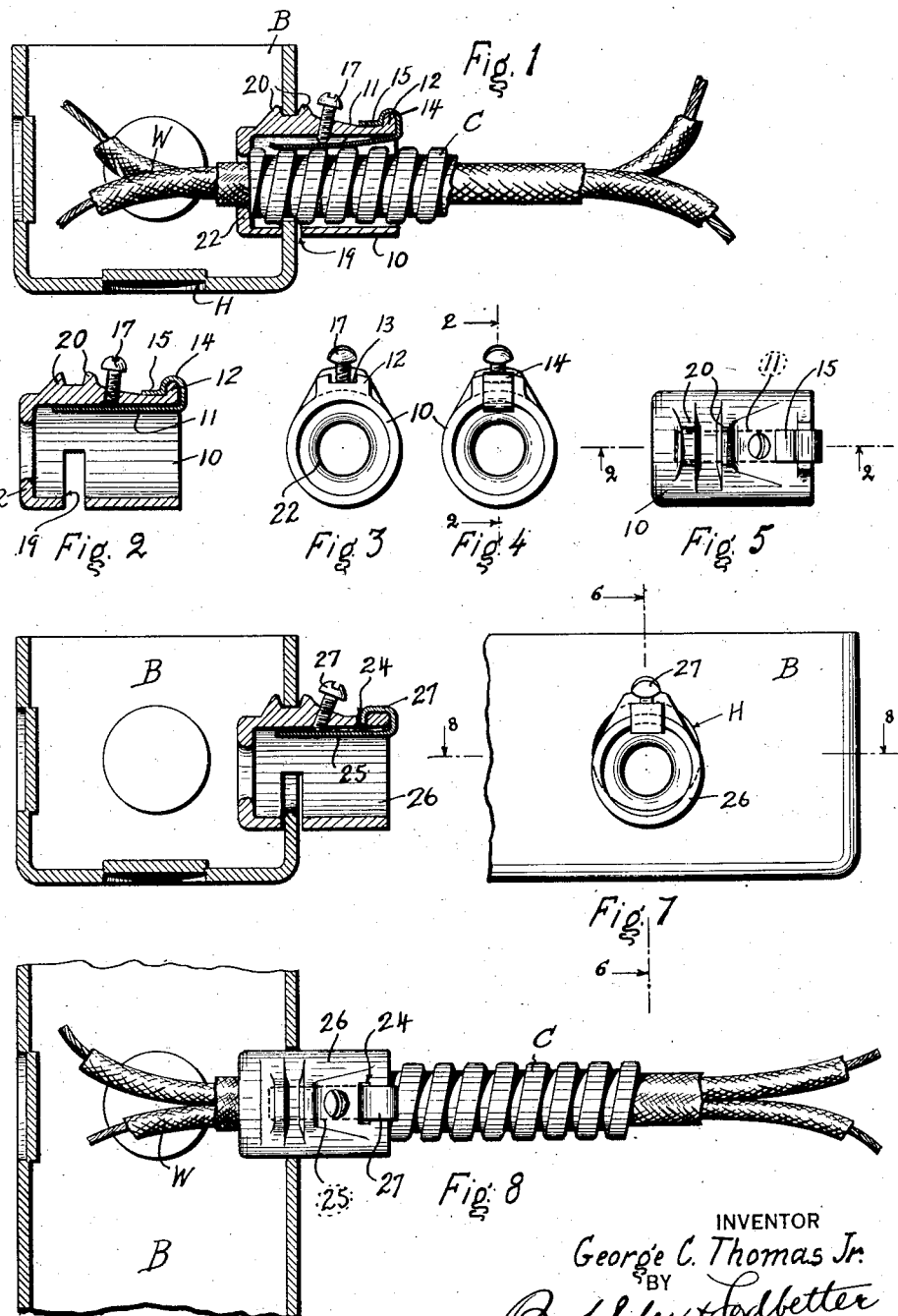
INVENTOR
George C. Thomas Jr.
BY
Bohleber Ledbetter
ATTORNEYS Patented Oct. 4, 1927.

1,644,304

UNITED STATES PATENT OFFICE.

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY.

CABLE CONNECTER.

Application filed July 11, 1925. Serial No. 42,889.

This invention relates to cable connecters and particularly to connecters possessing improved means for clamping the cable therein and protecting the cable from damage caused by the clamping means.

An object of the invention is to produce an improved cable connecter embodying a bearing clamp plate which is not dependent on a screw or other operating means to hold it in position in the connecter sleeve and this is accomplished by having one end of the bearing plate attached to the sleeve connecter while the other end of the plate is movably free of the connecter and adapted to be brought to bear with great pressure on the cable to fasten the cable in the connecter.

A further object of the invention is to provide an improved bearing clamp plate in combination with a cable connecter sleeve which operates with any suitable connecter box anchorage means. In other words the improved bearing plate embraced in this invention is capable of use with connecter anchorage means other than the particular anchorage means herein disclosed.

A further object is to produce a connecter so formed as to fit into a box hole and leave a part of the edge or rim of the box hole in exposed position within the connecter, and to provide novel clamp means adapted to grip a cable between the exposed box hole edge and clamp means.

The accompanying drawing illustrates preferred forms of the invention wherein:

Figure 1 shows a box, connecter and cable assembly in section.

Figure 2 shows the connecter in longitudinal section removed from the box; Figures 3 and 4 show outside end elevations, while Figure 4 illustrates a top view of the connecter. In Figure 3 the clamp plate is omitted to better show the notch in which the clamp plate is mounted.

Figures 6, 7 and 8 illustrate a modified and improved form of the bearing plate structure, particularly a modified means for attaching the bearing plate to the sleeve.

Referring further to the drawing for a more detailed description of the invention, in electrical installation work it is necessary to secure armored cables or conduits C in outlet, junction and electrical fixture boxes B in order that the wires W of the cable may enter the box B for electrical connection. For this purpose it is necessary to use cable connecters which are anchored in the knockout holes H in the box B. While armored cable is shown, the connecter is adapted to work with other kinds of cable.

The improved connecter will now be explained and in the present form of the invention it comprises a sleeve 10 on one end of which is made suitable means for attaching or fixing thereto a bearing plate 11. One suitable form of attaching means comprises a rib 12 with a notch 13 therein made and one end of the bearing plate 11 is wrapped around the rib 12 within the notch 13 so as to rigidly attach one end of the bearing plate to the connecter. This leaves the other end of the bearing plate movably free. The wrapped portion 14 of the bearing plate may be straightened out in the form of a straight horizontal end 15 pressed flat against the surface of the connecter. The curved portion 14 together with the flat end 15 prevent displacement of the bearing plate from the sleeve thus holding it in place. The other end of the bearing plate is movably free and projects forwardly towards the other end of the sleeve 10. This bearing plate 11 is of simple structure and made from light weight metal and is easily brought down against the cable armor C by a clamp screw or other means.

Any suitable operating means is carried by the connecter sleeve 10 for clamping the cable C in the connecter and to this end a screw 17 is carried within a threaded hole made in the sleeve thereby enabling the screw to work down against the movable bearing plate 11 to bring it into engagement with the cable C as shown in Figure 1. The bearing plate 11 serves to prevent the screw 17 from damaging the armor C of the cable. Furthermore the bearing plate 11 serves to distribute the pressure of the screw along the cable and particularly serves to transfer the pressure applied by the screw rearwardly toward the box wall B so as to render effective the connecter anchorage means herein disclosed. Together the operating means 17 and cable clamp plate 11 constitute clamp means by which a cable is gripped between the connecter and box hole edge.

Any suitable connecter and box anchorage means is made a part of the sleeve structure 10. For example a nut and screw arrangement may be used but for the purpose of simplicity there is shown a wall entrant slot 19 with raised spaced ribs 20 made a part of the connecter sleeve 10 and which ribs are preferably disposed diametrically opposite the slot 19. The raised ribs 20 form a groove in substantial radial alignment with the box wall entrant slot 19 so that the rim H defining the knockout cable receiving hole in the box B may be received into the slot 19 and into the groove defined by the ribs 20 as well. The slot 19 permits the sleeve to be adjusted up and down in the box hole H so as to easily work the box wall B between the ribs 20 whereupon the cable C is inserted and the cable armor then rests directly in contact with the box hole rim H or that portion thereof which is exposed through the slot 19 within the sleeve.

A clamp screw or other suitable cable clamp operating means is now brought to bear against the plate 11 which in turn forces the cable armor C down against the box edge or rim H and simultaneously with this operation it follows that the reaction on the sleeve 10 causes the groove between the ribs 20 to seat firmly up against that portion of the box hole rim H opposite to the portion thereof within the sleeve slot 19. This action on the part of the screw 17 not only clamps the cable C within the sleeve connecter but simultaneously anchors the sleeve itself within the box at one and the same screw operation.

The inner end of the sleeve is provided with a stop bushing 22 which is made with an oval or rounded shoulder aperture through which the cable wires W are passed and drawn into the box B.

Figures 6, 7 and 8 in the drawing illustrate a modified form of structure in respect to the attaching means by which the clamp plate is secured in the sleeve. A perforation 24 is made in the sleeve adjacent the outer end thereof and one end of a clamp plate 25 is wrapped around the end of the sleeve 26 and inserted through the aperture 24, the wrapped portion of the clamp plate being pointed out at 27. This form of construction enables the plate 25 to have one end thereof securely attached to the sleeve while the other end thereof is movably free and is carried downwardly with great pressure against the cable end by the pressure of a screw 27.

This improved connecter carries a bearing clamp plate, as will be seen, which is not held in place by a screw, which takes up very little space and which protects the cable from the biting end of the screw and which distributes the screw pressure along the cable.

What I claim is:

1. A cable connecter adapted to be anchored in a box and comprising, a sleeve to receive a cable end, a rib made at one end of the sleeve, a bearing clamp plate having its end wrapped around the rib thereby attaching one end of the plate to the sleeve leaving the other end movably free, a screw carried by the sleeve bearing against the plate, and connecter anchorage means carried by the sleeve.

2. A cable connecter adapted to be anchored in a box and comprising, a sleeve to receive a cable end, a rib made at one end of the sleeve, a bearing clamp plate having its end wrapped around the rib thereby attaching one end of the plate to the sleeve leaving the other end movably free, a horizontal end portion formed on the wrapped end of the plate and lying flat against the wall of the sleeve co-operating with said wrapped end to rigidly secure this end of the plate to the sleeve, a screw carried by the sleeve bearing against the plate, and connecter anchorage means carried by the sleeve.

3. A connecter comprising, a connecter member, a bearing clamp plate one end of which is attached to the member by wrapping its end about the edge of the member thereby leaving the other end flexibly free, box hole anchorage means carried with the member, and a screw threaded through the member to engage the bearing clamp plate and render effective the anchorage means.

In testimony whereof I affix my signature.

GEORGE C. THOMAS, Jr.